United States Patent [19]

Leitmann et al.

[11] Patent Number: 5,398,785
[45] Date of Patent: Mar. 21, 1995

[54] SEMIACTIVE CONTROL APPARATUS FOR DAMPING VIBRATIONS OF A BODY

[75] Inventors: George Leitmann, Berkeley, Calif.; Edward Reithmeier, Ernatsreute, Germany

[73] Assignee: Regeants of the University of California, Berkeley, Calif.

[21] Appl. No.: 3,036

[22] Filed: Jan. 11, 1993

[51] Int. Cl.$^6$ .............................................. F16F 9/30
[52] U.S. Cl. ................................. 188/267; 267/136; 267/140.14
[58] Field of Search ........... 188/267; 257/136, 140.14, 257/140.15

[56] References Cited

U.S. PATENT DOCUMENTS

| | | | |
|---|---|---|---|
| 4,351,515 | 9/1982 | Yoshida | 188/267 |
| 4,858,733 | 8/1989 | Noguchi et al | 188/267 |
| 4,887,699 | 12/1989 | Ivers et al. | 188/378 |
| 4,892,328 | 1/1990 | Kurtzman et al. | 188/267 |
| 4,893,800 | 1/1990 | Tabata | 188/267 |
| 4,919,402 | 4/1990 | Doi et al. | 267/140.14 |
| 5,000,299 | 3/1991 | Goto et al. | 188/267 |
| 5,014,829 | 5/1991 | Hare, Sr. | 188/267 |
| 5,015,926 | 5/1991 | Casler | 318/9 |
| 5,029,677 | 7/1991 | Mitsui et al. | 188/267 |
| 5,076,403 | 12/1991 | Mitsui | 188/267 |
| 5,100,166 | 3/1992 | Mitsui | 188/267 |

FOREIGN PATENT DOCUMENTS 2255150 10/1992 United Kingdom ................ 188/267

Primary Examiner—Matthew C. Graham
Attorney, Agent, or Firm—Gray Cary Ware & Freidenrich

[57] ABSTRACT

A semiactive control apparatus for damping motion of a body. According to the sensed position and velocity of the body, a voltage is applied or removed from the electrorheological fluid contained in an elastic body and coupled to the body, thus damping the body's motion.

10 Claims, 7 Drawing Sheets

SEMIACTIVE CONTROL APPARATUS FOR DAMPING VIBRATIONS OF A BODY

FIELD OF THE INVENTION

This invention relates generally to vibration control apparatus, and more particularly to a system and a method for damping the motion of a body by applying a voltage to an elastic structure containing electrorheological fluid depending on the position and velocity of the body.

BACKGROUND OF THE INVENTION

As voltage is applied to or removed from electrorheological fluids, they stiffen or soften proportionally. Their unique property has been known for at least fifty years and has been used in conjunction with systems for damping the motion of a vibrating body. Systems include those, for example, that use sensors to sense tension or motion of a body in communication with electrorheological fluid. Various schemes have been used to control voltage so that it is applied or removed from the electrorheological fluid according to sensor information, thus causing a change in the viscosity of the fluid, and therefore altering its stiffness.

Well known examples in machinery dynamics using electrorheological fluids are noise-isolating suspensions for motors, transmissions, drives and shock absorbers for vehicles; vibration isolators for rotor bearings; vibration isolators in antennas, etc. Among electromechanical examples are vibration isolators for pickups in magnetic storage devices of computers, and impulse and vibration isolators for sensitive measuring devices. In structural engineering are oscillation isolators for bridges, and base isolation device for buildings subject to seismic disturbances.

These systems for vibration suppression are primarily based on "passive" measures such as tuning of parameters. That is, system parameters such as spring and damper constants, masses, etc. are chosen in some optimal fashion, e.g. so as to minimize the amplitude of oscillation of a critical system component. An improvement over the "passive" systems are systems employing "active" measures such as hydraulic or electromagnetic actuators. These and similar techniques suffer from a number of disadvantages. Specifically, they are costly, slow and complicated.

SUMMARY OF THE INVENTION

It has been found that elastic structures containing electrorheological fluids alter their stiffness and damping characteristics when subjected to an electric field. When electrorheological fluids are contained in, for example, a cylinder, the voltage u, applied to the structure is $U=E/I$, where E is the electric field and I is the length of the container.

The changes in stiffness and damping characteristics with an imposed electric field take place extremely rapidly ($10^{-4}[s]$ to $10^{-5}[s]$) thereby practically eliminating the problems of neglected dynamics of conventional actuators.

The present invention is a semiactive vibration control system for controlling the vibration of a body which is coupled to a container of electrorheological fluid. The position and velocity of the body are sensed, and according to the calculations made upon those sensed values, a voltage is either applied to or removed from electrodes in communication with the container, thus changing the stiffness and damping characteristics of the fluid extremely rapidly.

DETAILED DESCRIPTION OF THE INVENTION

Figure 1:
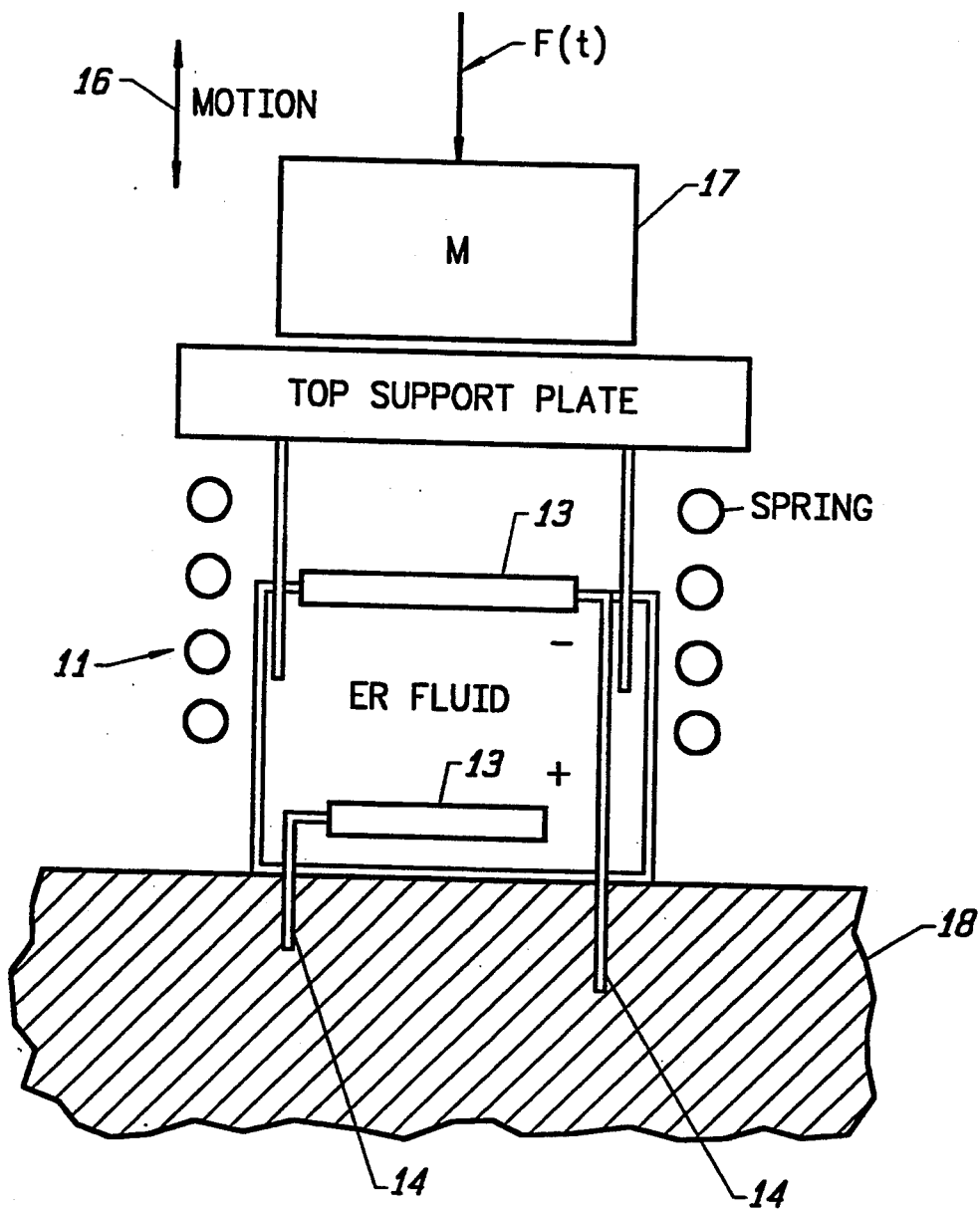
FIG. 1 shows an elastic structure appropriately filled with electrorheological fluid and positioned to be subject to an electric field.

Turning to FIG. 1, a sample elastic structure 11 appropriately filled with electrorheological fluid is sealed, for example, with a silicone rubber sealant. The exterior housing (not shown) may be polystyrene outer strips, approximately 0.5 mm thick and the interior could be lined with aluminum foil electrodes 13 which are powered through leads 14. When a voltage is applied to or removed from the electrorheological fluid, its viscosity changes and hence stiffens or relaxes. Because the electrorheological fluid fills the elastic structure, the elastic structure in turn stiffens or relaxes when a voltage is applied to or is removed from the electrorheological fluid. FIG. 1 shows an example configuration, including springs of the elastic structure and a top support plate coupling the elastic structure 11 to the body 17. Depending upon the configuration of the system to which the vibration control is coupled, the elastic structure is free to move, such motion indicated by arrows 16. In the remaining discussion, for the sake of simplicity, motion indicated by arrows 16 is restricted to rectilinear motion.

Figure 2:
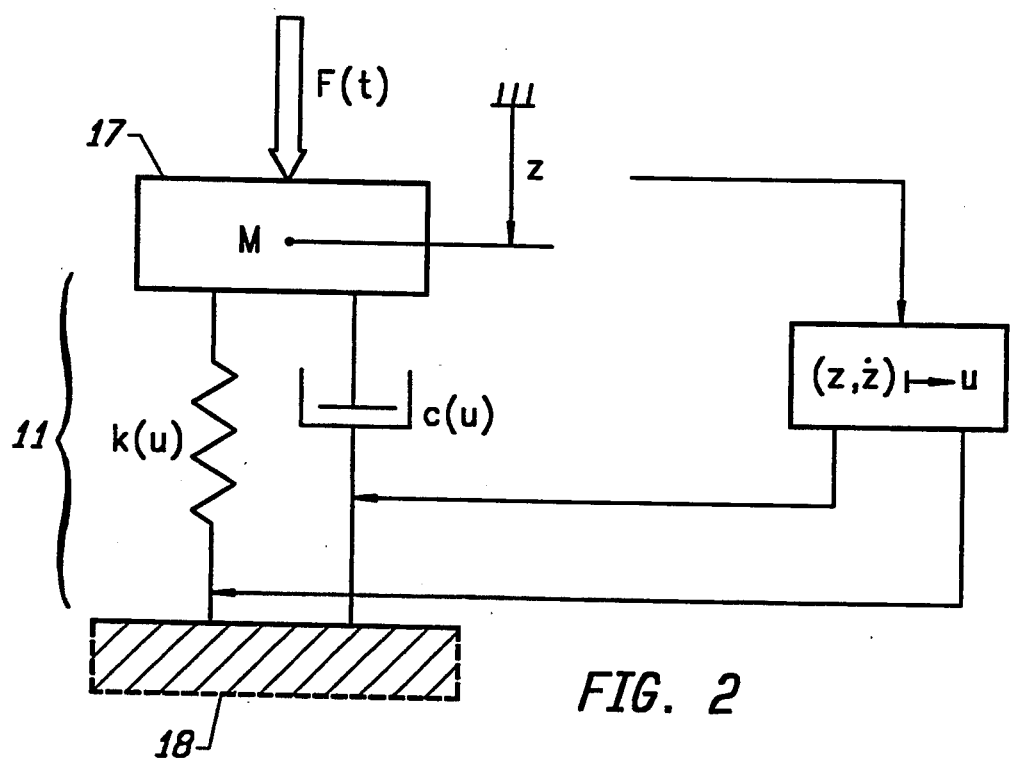
FIG. 2 is a schematic drawing of the control system of the present invention.

As shown in FIG. 2, the elastic structure 11 is coupled to body 17 having a mass M. The body 17 and the elastic structure 11 are supported by support 18 which is the stable reference position. For purposes of the present discussion, body 17 moves with one-degree of freedom z, however, the present invention is of course applicable to a system having three-degrees of freedom. FIG. 2 shows a force F(t) affecting body 17 causing motion in the z direction. As it will be discussed below, the present invention does not depend on the type of force applied. Although different excitation functions, such as periodic, continuous non-periodic, periodic pulses and random excitation functions are applied to body 17, the result achieved is the same. Simulations, discussed below, show that the maximum displacement of a body with respect to exciting frequency of a controlled response is much lower than that of an uncontrolled response. This is in particular the case near resonance. Detailed mathematical derivations of the formulas discussed below are to appear in Dynamics & Control, Vol. 3, January 1993.

Force F(t) will cause motion of the body 17 in the z direction. In the present invention, the motion's components position z and velocity $\dot{z}$ of the body 17 are correlated to the spring coefficient k(u) and the damping coefficient c(u) of the elastic structure 11. Both of these coefficients, k and c, are functions of voltage u and can be measured (see for example, Choi Y., Sprecher F, and Conrad H, J. Intell. Mat. Syst. Structure, vol. 1, pp 91-104, 1990). As position and velocity of the body is detected, a voltage u from a suitable source, through electrodes 13, is applied to or removed from the elastic structure 11 and its stiffness and damping changes. Accordingly, by monitoring the body's position and velocity and thereby controlling the electrorheological fluid's stiffness and damping, the motion of the body is controlled, as will be shown in detail hereinafter.

Figure 3:
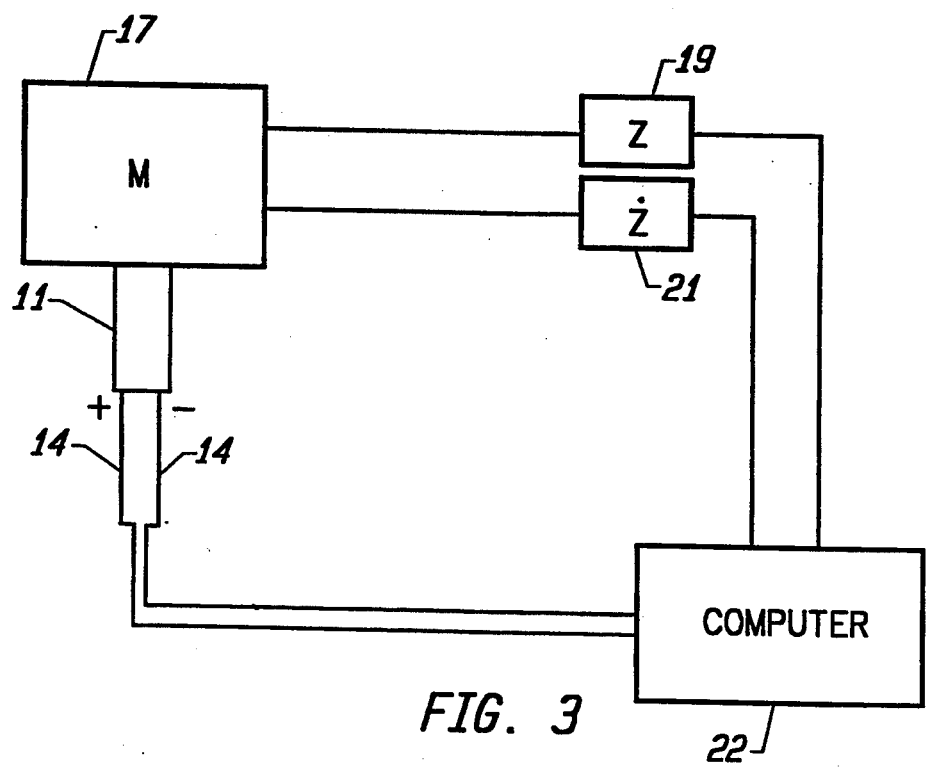
FIG. 3 is another schematic drawing of the apparatus of the present invention.

FIG. 3 shows an schematic of an embodiment of the present invention. As discussed above, the body 17 is coupled to the elastic structure 11 which is connected to a voltage supply 14. The body 17 is in communication with sensors 19 and 21, which sense position z and velocity $\dot{z}$ of the body, respectively. Sensing means for velocity is, for example, a velocity sensor such as a Laser HF-Vibrometer, and sensing means for position is an integrator of velocity such as a Laser HF-Vibrometer, which are conventional sensors. Position and velocity measurement information is sent to computer 22 which performs a calculation to establish the appropriate voltage. Thus, by monitoring and using the values of position and velocity of the body at closely spaced time intervals, the control scheme of the present invention, discussed below, takes advantage of the readily and rapidly attainable alteration of stiffness and damping characteristics of the elastic structure 11 in order to suppress vibration of the body 17.

The controller of the present invention does not depend upon the type of force F(t) applied to body 17. Force F(t), in the present discussion is any force, $$M\ddot{z} + c(u)\dot{z} + k(u)z = F(t),\ z(0) = z_0, \dot{z}(0) = \dot{z}_0. \quad (1)$$

Figure 4:
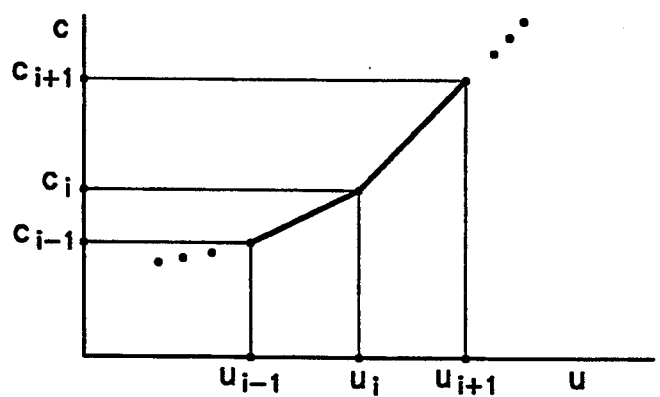
FIG. 4 is a graph showing a theoretical damping coefficient of an elastic structure filled with electrorheological fluid as a function of an applied incremental voltage.

FIG. 4 is a graph of values of c(u) which can be measured as discussed above, where $$0 = u_1 < \ldots < U_m = \bar{u}, \quad (2)$$

and $$c_i = c(u_i),\ k_i = k(u_i),\ i = 1, 2, \ldots, m. \quad (3)$$

Figures 5A, 5B:
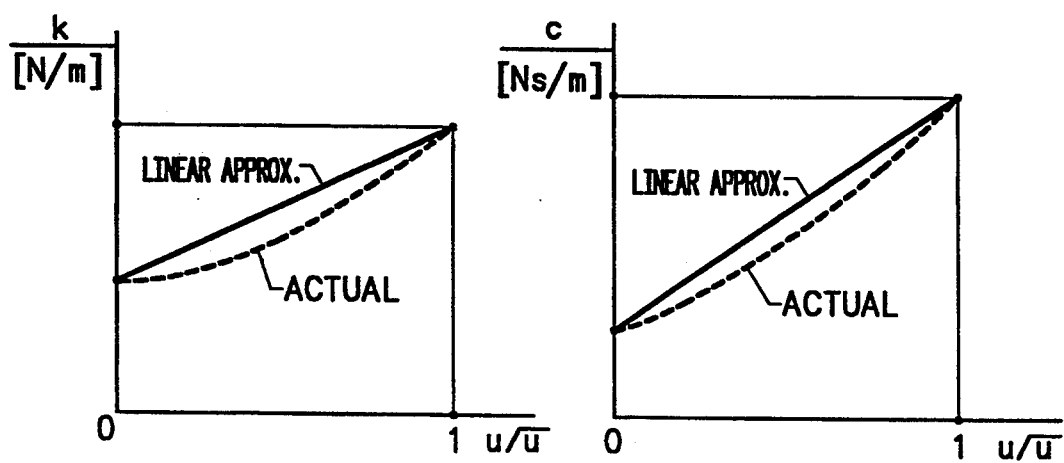
FIGS. 5A and 5B show linear approximations for damping and spring coefficients where the approximations are shown between two points.

A similar graph for k(u) (not shown) can be obtained in the same manner. For interpolation of points $(u_i, c_i)$ and $(u_i, K_i)$, $i = 1, \ldots, m$, various techniques are used, such as splines. For practical purposes, straight line interpolation is used. FIGS. 5A and 5B show a straight line interpolation for c(u) and k(u) respectively, where m=2. For the sake of simplicity, the remaining discussion refers to the case of m=2. Accordingly, values for c(u) and k(u) are obtained at the two ends of the straight line. Given the parameters of the particular system, that is, c(u), k(u) and the mass M of body 17, the controller of computer 22 for the apparatus of the present invention is constructed in accordance with the flow chart as shown in FIG. 6.

Values dependent upon the parameters of the particular system are preprogrammed into the controller and are indicated in box 23. Once programmed into the controller, the values in box 23 remain constant and are used in the determination of the state of the voltage supply 14 according to the steps indicated in the flow chart shown in FIG. 6. Derivation of the values for P, $B_1$ and hence $R_1$ are described below. Sensors 19 and 21 provide values for position z and velocity $\dot{z}$, the values respectively indicated in boxes 19' and 21'. These values describe the state of the system $x = x(z, \dot{z})$ as shown in box 24 and are plugged into the switching function $b_1(x)$ shown in box 26. Depending upon whether the value obtained from the switching function $b_1(x)$ is positive or negative, as shown in decision box 27, the voltage is switched either "on" or "off" as indicated in boxes 28 and 29, respectively.

Figure 6:
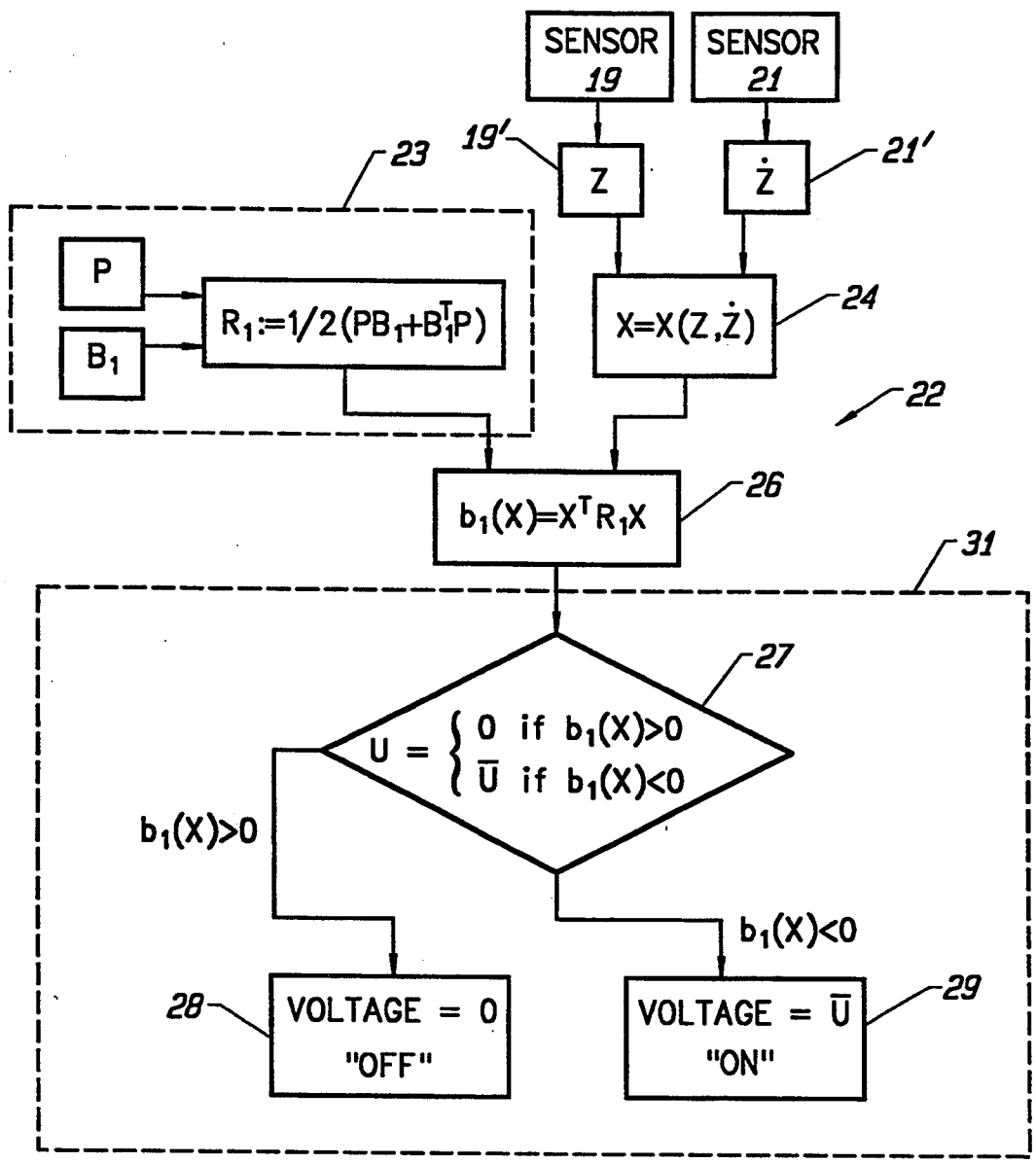
FIG. 6 is a flow chart of the controller algorithm of the present invention.

In the simplest case, the switching function $b_1(x)$ shown in box 26 of FIG. 6 generates a voltage having either of two values, "on" or "off," as shown in box 31. However, as mentioned above, and illustrated in FIG. 4, the voltage at any instant, can take on maximum and minimum values on appropriate intervals other than $U=0$ or $u=\bar{u}$, in the case where the linear approximation is replaced by a piece-wise linear approximation. Therefore, while in the present discussion the switching function $b_1(x)$ generates two voltage values, a more general case statement than that made in box 31 can be arranged.

In order to determine the $R_1$ value shown in box 23, P and $B_1$ are calculated from the measured values of c(u) and k(u) and the mass M, of the body 17. To begin with, $\beta_1^c$, $\alpha_1^c$, $\beta_1^k$ and $\alpha_1^k$ are calculated according to the following equations, for the case of m=2:

$$c(u) = \alpha_1^c + \beta_1^c u \text{ for } u \in [0, \bar{u}], \quad (4)$$

and $$k(u) = \alpha_1^k + \beta_1^k u \text{ for } u \in [0, \bar{u}], \quad (5)$$

$$\beta_1^c := \frac{c_2 - c_1}{\bar{u}}, \quad (6)$$

$$\alpha_1^c := c_1, \quad (7)$$

$$\beta_1^k := \frac{k_2 - k_1}{\bar{u}}, \quad (8)$$

and $$\alpha_1^k := k_1. \quad (9)$$

After having obtained $\beta$ and $\alpha$ for c and k, the two possible values for each $k^{(1)}$ and $c^{(1)}$ are obtained by performing the following calculations:

$$k^{(1)} = \frac{1}{M}[\alpha_1^k + \beta_1^k \bar{u}],\ c^{(1)} = \frac{1}{M}[\alpha_1^c + \beta_1^c \bar{u}], \quad (10)$$

and $$k^{(1)} = \frac{\alpha_1^k}{M}, c^{(1)} = \frac{\alpha_1^c}{M}. \quad (11)$$

Once values for $k^{(1)}$ and $c^{(1)}$ are obtained, system parameters, $\xi$ and can be obtained. By determining allowable values for $\xi$ and , the matrix P, shown in box 23, can be generated. Allowable system parameters, $\xi$ and are found by satisfying the following inequalities:

$$\xi, \eta, p_3 > 0, \quad (12)$$

$$1 < \min\{\eta c^{(1)}, \sqrt{\xi} \, \eta\}, \quad (13)$$

and $$[\xi - (\eta k^{(1)}) - c^{(1)}]^2 < 4k^{(1)}(\eta c^{(1)} - 1). \quad (14)$$

Figure 7:
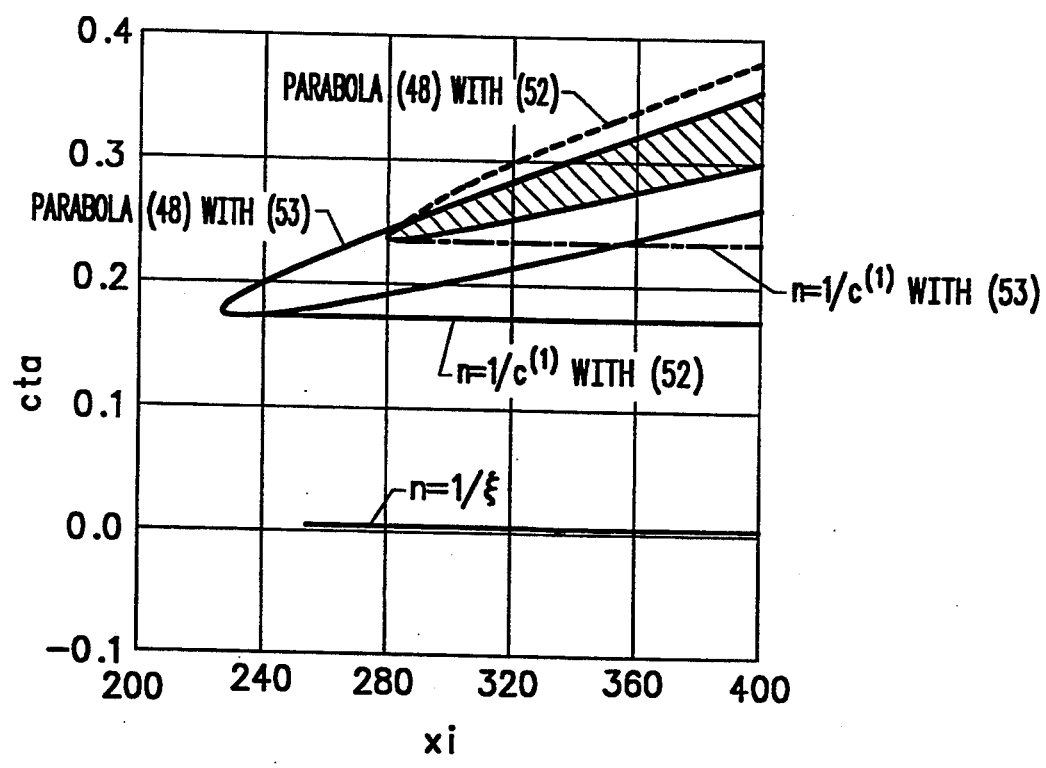
FIG. 7 is a graph of control parameters xi ($\xi$) versus eta ( ) showing the boundaries of allowable xi and eta, such used to calculate P of the present invention.

In inequality (12), a $p_3$ can be chosen. For example, a normalizing value of $p_3 = 1$ can be chosen. By satisfying the aforementioned inequalities, a range of allowable values for $\xi$ and $\eta$ can thus be found. FIG. 7 shows a graph illustrating allowable values for $\xi$ and $\eta$ for the simplest case with m=2, where system values are chosen for illustrative purposes so that M=1[kg], $\alpha_1^k = 1000$ [Ns/mV], $\beta_1^k = 250$[N/mV], $\alpha_1^c = 2$[Ns/mV] and $\beta_1^c = 3$[Ns/mV] allowable values of xi and eta are, for example, xi=400 and eta=0.32.

Having chosen a $p_3$ greater than zero and having determined allowable values of $\epsilon$ and, $p_1$ and $p_2$ can be found according to the following equation:

$$p_1 = \xi p_3, p_2 = \eta p_3. \quad (15)$$

The components of matrix P of box 23 of FIG. 6 are therefore found and are arranged forming a positive, definite and symmetric matrix:

$$P =: \begin{bmatrix} p_1 & p_3 \\ p_3 & p_2 \end{bmatrix}. \quad (16)$$

To find $B_1$ of box 23 of FIG. 6, values already found for $\beta_1^c$ and $\beta_1^k$ and M are used to form the following matrix $B_1$:

$$B_1 := \begin{bmatrix} 0 & 0 \\ -\frac{\beta_1^k}{M} & -\frac{\beta_1^c}{M} \end{bmatrix}. \quad (17)$$

Matrix $R_1$ is then found by the following equation:

$$R_1 := \frac{1}{2}(PB_1 + B_1^T P) \quad (18)$$

The value for $R_1$ is stored in the controller's 22 memory and is used to calculate the switching function $b_1(x)$ when sensors 19 and 21 provide to the controller with the state of the motion of the body, $x=x(z, \dot{z})$, indicated by box 24 of FIG. 6.

In order to find the voltage u to be supplied to voltage supply 14, the switching function $b_1(x)$ of box 26 is calculated according to the following equation:

$$b_1(x) := x^T R_1 x. \quad (19)$$

As shown in decision box 27, when $b_1(x)$ is greater than zero, the voltage u=0 (or "off") and when $b_1(x)$ is less than zero, the voltage $u=\bar{u}$ (or "on"). The resultant voltage u is shown in boxes 28 and 29, respectively.

The present invention also accounts for the situation when $x=x(z, \dot{z})$ is subject to measurement error and therefore, to diminish the effect of measurement errors, the control scheme can be modified by adopting a linear control policy in the transition regions (where $x=x(z, z)$ is not measured exactly), depending upon the maximum measurement error. Such a control scheme is known as a "fuzzy" controller.

To summarize, the design of the controller of computer 22 which is based on the so called Lyapunov stability theory, renders a "bang-bang" control such that, depending upon the body's position and velocity $(z, \dot{z})$, the voltage u, takes on a minimum (0) or its maximum ($\bar{u}$) value. The criterion for the choice of the voltage value depends on the sign of the switching function $b_1(x)$. The locus of zero values of switching function $b_1(x)$ determined the position-velocity combination for which a voltage change from 0 to $\bar{u}$ or from $\bar{u}$ to 0 takes place. In the present invention, the corresponding changes in stiffness k(u) and damping c(u) occur within microseconds, thereby obviating a major drawback of conventional actuators which react relatively slowly to control commands.

Simulation results described herein for sinusoidal excitation and periodic pulse excitation were obtained for M=1[kg]. In constructing the controller linear approximations of the spring and damping coefficients, functions were employed with respective minimum values $k_1 = 1000$[N/m], $c_1 = 2$[Ns/m] and maximum values $k_1 = 1250$[N/m] and $c_1 = 5$[Ns/m]. In the simulations, the actual functions of voltage as determined experimentally (see above), were used. The initial conditions $z(0)=0$ and $\dot{z}(0)=0$ were used in all simulations. Simulation for other force functions such as continuous non-periodic and discontinuous periodic (not shown or discussed herein) have delivered similar results.

Figure 8A:
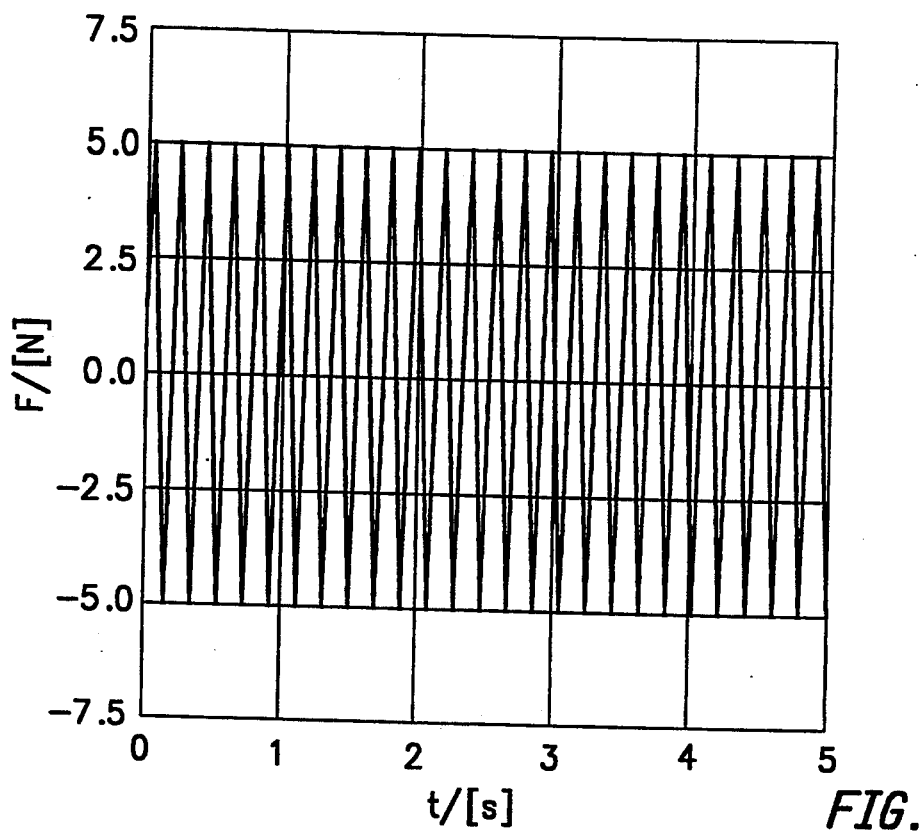
FIG. 8A is a graph of a sinusoidal excitation force which in a simulation is applied to a body.
Figure 9A:
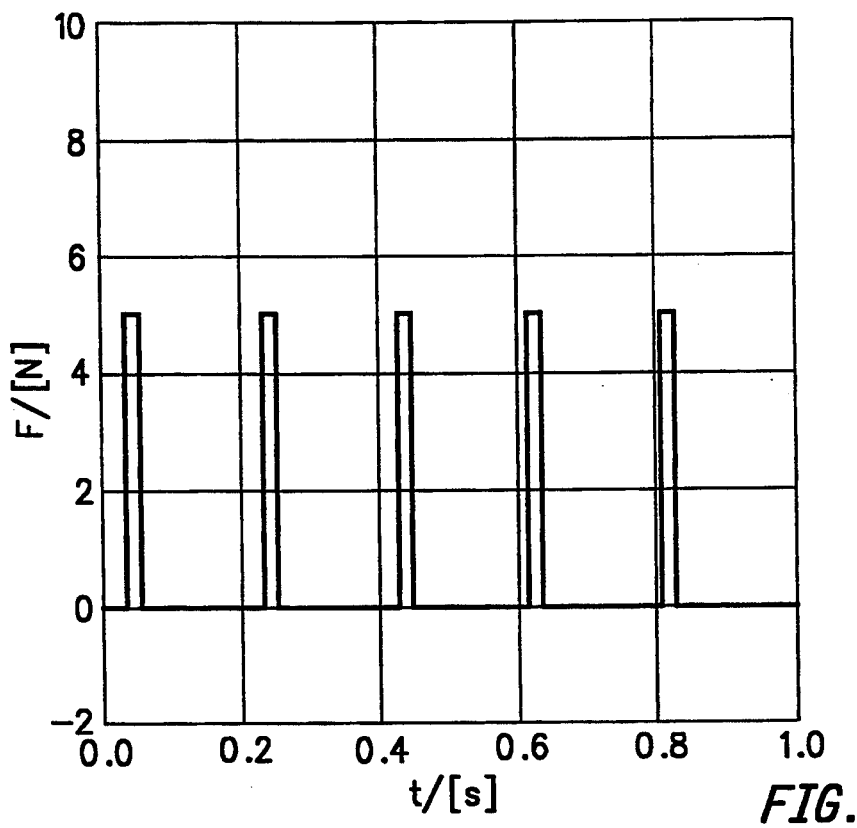
FIG. 9A is a graph of a periodic pulse excitation force which in a simulation is applied to a body.

FIG. 8A shows a graph of a sinusoidal excitation function which is applied to body 17. The forcing function shown in therein is $F(t)=\bar{F} \sin(\nu t)$ with $\bar{F}=5$[N] and $\nu=32.5$[1/s]. These parameters were also used to generate the graph of FIG. 9A which shows a graph of a periodic pulse excitation which is applied to body 17.

Figure 8B:
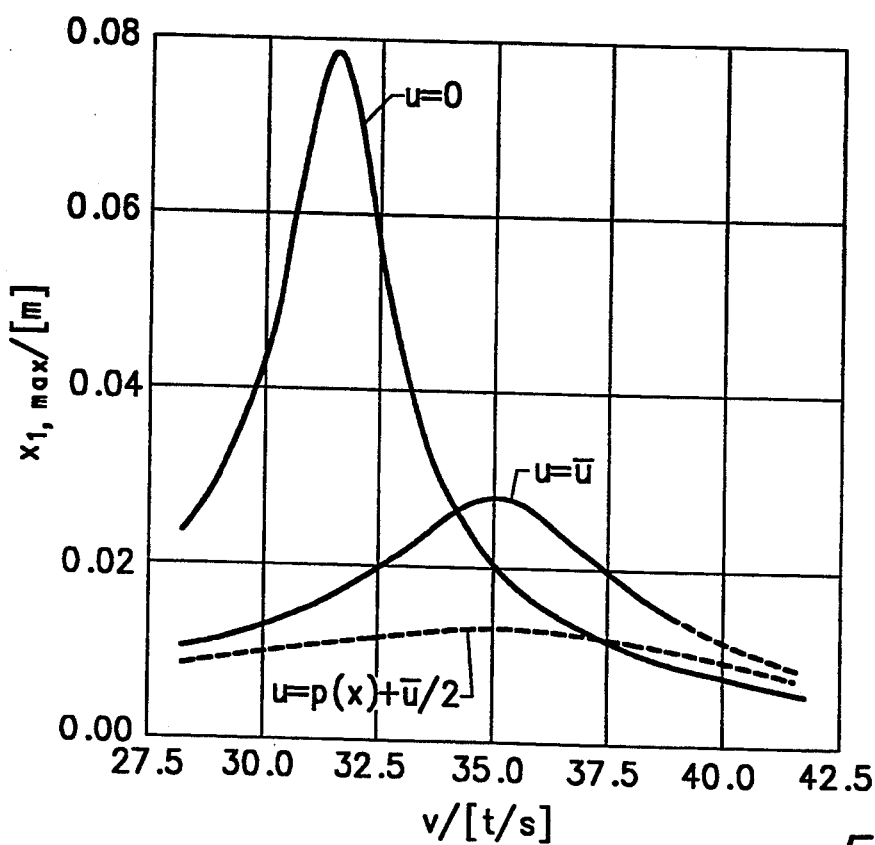
FIG. 8B is a graph of exciting frequency versus maximum response amplitude of the motion of a body controlled by the present invention compared with an uncontrolled body.
Figure 9B:
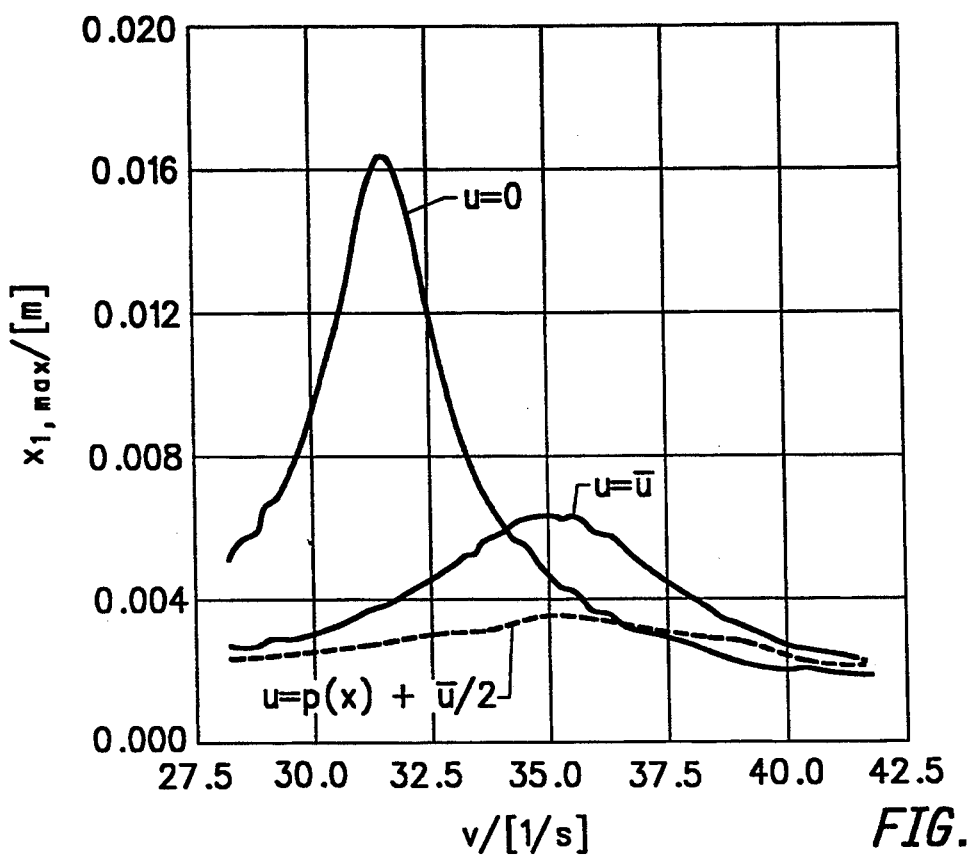
FIG. 9B is a graph of exciting frequency versus maximum response amplitude of the motion of a body controlled by the present invention compared with an uncontrolled body.

FIGS. 8B and 9B show graphs of the effect of the respective excitation functions when voltage U=0, $U=\bar{u}$, and when voltage u is computed according to the scheme of the present invention (indicated by the dotted line). In both cases, the amplitude of the displacement of the body for the controlled voltage is nearly flat compared to the uncontrolled responses U=0 and $u=\bar{u}$. Thus, the response controlled by the present invention is greatly improved, especially near resonance. Moreover, the effect of the frequency dependence is also essentially suppressed.

What is claimed is:

1. An apparatus for damping motion of a body, comprising:
   means for containing electrorheological fluid, said means being coupled to said body;
   means for applying a voltage to said electrorheological fluid, said voltage being defined as u and wherein $\bar{u}$ represents the maximum value of u and 0 represents the minimum value of u;

means for detecting the velocity of the motion of said body and for generating a velocity signal representative thereof;

means for detecting the position of said body with respect to a pre-determined reference position and for generating a position signal representative thereof;

single means connected with said voltage applying means and responsive to said position and velocity signals for providing signals for changing the voltage applied to said fluid depending upon both of said position and velocity signals; and wherein said single means includes processor means for storing and utilizing said position and velocity signals and system parameter values which are based upon the measured damping values, spring values, and the mass of said body in such a way that said system parameters are defined as matrices P and $B_1$ having a set of components, wherein said measured damping values are defined as c(u), said spring values are defined as k(u) and said mass is defined as M, wherein introduced variables $\alpha$ and $\beta$ each of which having a set of values $\alpha_1{}^c$, $\alpha_1{}^k$, $\beta_1{}^c$, $\beta_1{}^k$, and which are derived from a first set of equations including $$c(u)=\alpha_1{}^c+\beta_1{}^c u \text{ for } u\epsilon[0,\bar{u}],$$

and $$k(u)=\alpha_1{}^k+\beta_1{}^k u \text{ for } u\epsilon[0,\bar{u}],$$

wherein said values of $\alpha$ and $\beta$ are used to obtain values for additional introduced values $k^{(1)}$ and $c^{(1)}$ which are derived from a second set of equations which results are used to find values for yet further additional introduced values $\xi,\eta$, and $p_3$ according to the condition that $$\xi,\eta,p_3>0,$$

to thereby obtain values for $p_1$, and $p_2$ according to a third set of equations $$p_1=\xi p_3, p_2=\eta p_3,$$

wherein said values for $p_1$, $p_2$ and $p_3$ are components defining said matrix P, wherein said matrix $B_1$ is defined by values including said values for $\beta$ and M, and wherein said matrices P and $B_1$ and said position and velocity signals are combined in a calculation which results in said signals for changing the voltage thereby altering the damping characteristics of the apparatus.

2. An apparatus as recited in claim 1 wherein said means responsive to position and velocity signals includes a computer.

3. An apparatus as recited in claim 1 wherein said velocity detector is a velocity sensor.

4. An apparatus as recited in claim 1 wherein said position detector is an integrator of velocity.

5. An apparatus as recited in claim 1 wherein said voltage is changed from an on state to an off state and from an off state to an on state.

6. An apparatus as recited in claim 1 wherein said voltage is changed by varied amounts.

7. A method for damping motion of a body, comprising:

containing electrorheological fluid;

coupling said electrorheological fluid to said body;

detecting the velocity of the motion of said body;

generating a velocity signal representative thereof;

detecting the position of said body with respect to a pre-determined reference position;

generating a position signal representative thereof;

generating a voltage signal being defined as u and wherein $\bar{u}$ represents the maximum value of u, wherein 0 represents the minimum value of u, wherein said generating of said voltage signal is in response to said position and velocity signals and is carried out by applying a calculation which depends on said velocity signal, said position signal and system parameters which are based upon the measured damping values, spring values and the mass of said body wherein said system parameters are defined as matrices P and $B_1$ having a set of components, wherein said measured damping values are defined as c(u), said spring values are defined as k(u) and said mass is defined as M, wherein introduced variables $\alpha$ and $\beta$ each of which having a set of values $\alpha_1{}^c$, $\alpha_1{}^k$, $\beta_1{}^c$, $\beta_1{}^k$, and which are derived from a first set of equations including $$c(u)=\alpha_1{}^c+\beta_1{}^c u \text{ for } u\epsilon[0,\bar{u}],$$

and $$k(u)=\alpha_1{}^k+\beta_1{}^k u \text{ for } u\epsilon[0,\bar{u}],$$

wherein said values of $\alpha$ and $\beta$ are used to obtain values for additional introduced values $k^{(1)}$ and $c^{(1)}$ which are derived from a second set of equations which results are used to find values for yet further additional introduced values $\xi,\eta$, and $p_3$ according to the condition that $$\epsilon,\eta,p_3>0,$$

to thereby obtain values for $p_1$, and $p_2$ according to a third set of equations $$p_1=\xi p_3, p_2=\eta p_3,$$

wherein said values for $p_1$, $p_2$ and $p_3$ are components defining said matrix P, wherein said matrix $B_1$ is defined by values including said values for $\beta$ and M, and wherein said matrices P and $B_1$ and said position and velocity signals are combined in said calculation which results in said voltage signal; and applying said voltage signal to said electrorheological fluid.

8. An apparatus for damping motion of a body, comprising:

an elastic structure containing electrorheological fluid, said structure being in communication with said body;

means for applying a voltage to said electrorheological fluid, said voltage being defined as $\bar{u}$ and wherein u represents the maximum value of u and 0 represents the minimum value of u;

a position sensor for detecting the position of said body and generating a position signal representative of said position of said body;

a velocity sensor for detecting the velocity of said body and generating a velocity signal representative of said velocity of said body;

a computer being in communication with said position sensor and said velocity sensor and having predetermined system parameters which are based upon the measured damping values, spring values and the mass of said body programmed therein, wherein said system parameters are defined as matrices P and $B_1$ having a set of components, wherein said measured damping values are defined as c(u), said spring values are defined as k(u) and said mass is defined as M, wherein introduced variables $\alpha$ and $\beta$ each of which having a set of values $\alpha_1{}^c$, $\alpha_1{}^k$, $\beta_1{}^c$, $\beta_1{}^k$, and which are derived from a first set of equations including $$c(u)=\alpha_1{}^c+\beta_1{}^c u \text{ for } u\epsilon[0,\overline{u}],$$

and $$k(u)=\alpha_1{}^k+\beta_1{}^k u \text{ for } u\epsilon[0,\overline{u}],$$

wherein said values of $\alpha$ and $\beta$ are used to obtain values for additional introduced values $k^{(1)}$ and $c^{(1)}$ which are derived from a second set of equations which results are used to find values for yet further additional introduced values $\xi,\eta$, and $p_3$ according to the condition that $$\xi,\eta,p_3 > 0,$$

to thereby obtain values for $p_1$, and $p_2$ according to a third set of equations $$p_1=\xi p_3, p_2=\eta p_3,$$

wherein said values for $p_1$, $p_2$ and $p_3$ are components defining said matrix P, wherein said matrix $B_1$ is defined by values including said values for $\beta$ and M, and wherein said matrices P and $B_1$ and said position and velocity signals are combined by said computer so that said voltage signal is generated in response to said calculations; and
    means connected to said computer and responsive to said voltage signal for applying a voltage to said fluid depending on the value of said voltage signal.

9. A method for damping a moving body, comprising the steps of:
    (a) coupling said body to an arrangement including an elastic structure containing electrorheological fluid, said arrangement having both a damping coefficient and a spring coefficient that can be varied in a controlled way and means for detecting the voltage of said electrorheological fluid generated by said moving body, said voltage being defined as u and wherein $\overline{u}$ represents the maximum value of u and 0 represents the minimum value of u;
    (b) monitoring the position and velocity of said moving body and generating position and velocity signals, said monitoring performed in a manner which includes a calculation involving said velocity signals as well as involving system parameters which are based upon measured damping values, spring values and the mass of said body wherein said System parameters are defined as matrices P and $B_1$ having a set of components, wherein said measured damping values are defined as c(u), said spring values are defined as k(u) and said mass is defined as M, wherein introduced variables $\alpha$ and $\beta$ each of which having a set of values $\alpha_1{}^c$, $\alpha_1{}^k$, $\beta_1{}^c$, $\beta_1{}^k$, and which are derived from a first set of equations including $$c(u)=\alpha_1{}^c+\beta_1{}^c u \text{ for } u\epsilon[0,\overline{u}],$$

and $$k(u)=\alpha_1{}^k+\beta_1{}^k u \text{ for } u\epsilon[0,\overline{u}],$$

wherein said values of $\alpha$ and $\beta$ are used to obtain values for additional introduced values $k^{(1)}$ and $c^{(1)}$ which are derived from a second set of equations which results are used to find values for yet further additional introduced values $\xi,\eta$, and $p_3$ according to the condition that $$\xi,\eta,p_3 > 0,$$

to thereby obtain values for $p_1$, and $p_2$ according to a third set of equations $$p_1=\xi p_3, p_2=\eta p_3,$$

wherein said values for $p_1$, $p_2$ and $p_3$ are components defining said matrix P, wherein said matrix $B_1$ is defined by values including said values for $\beta$ and M, and wherein said matrices P and $B_1$ and said position and velocity signals are combined; and
    (c) varying the damping and spring coefficients of said arrangement in response to and dependent on said calculation and in a way which dampens the movement of said body.

10. An apparatus for damping the motion of a moving body, comprising:
    (a) means for coupling to said body an arrangement including an elastic structure containing electrorheological; fluid, said arrangement, including an elastic structure containing electrorheological fluid, said arrangement having both a damping and spring coefficient that can be varied in a controlled way and means for detecting the voltage of said electrorheological fluid generated by said moving body, said voltage being defined as u and wherein $\overline{u}$ represents the maximum value of u and 0 represents the minimum value of u;
    (b) means for monitoring the position and velocity of said moving body and generating position and velocity signals, said monitoring means performing said monitoring function in a manner which includes a calculation involving said position and velocity signals as well as involving system parameters based upon damping values, spring values and the measured mass of said body are defined as matrices P and $B_1$ having a set of components, wherein said measured damping values are defined as c(u), said spring values are defined as k(u) and said mass is defined as M, wherein introduced variables $\alpha$ and $\beta$ each of which having a set of values $\alpha_1{}^c$, $\alpha_1{}^k$, $\beta_1{}^c$, $\beta_1{}^k$, and which are derived from a first set of equations including $$c(u)=\alpha_1{}^c+\beta_1{}^c u \text{ for } u\epsilon[0,\overline{u}],$$

and $$k(u)=\alpha_1{}^k+\beta_1{}^k u \text{ for } u\epsilon[0,\overline{u}],$$

wherein said values of $\alpha$ and $\beta$ are used to obtain values for additional introduced values $k^{(1)}$ and $c^{(1)}$ which are derived from a second set of equations which results are used to find values for yet further additional introduced values $\xi,\eta$, and $p_3$ according to the condition that $$\xi,\eta,p_3 > 0,$$

to thereby obtain values for $p_1$, and $p_2$ according to a third set of equations $$p_1 = \xi p_3, p_2 = \eta p_3,$$

wherein said values for $p_1$, $p_2$ and $p_3$ are components defining said matrix P, wherein said matrix $B_1$ is defined by values including said values for s and M, and wherein said matrices P and $B_1$ and said position and velocity signals are combined in said calculation; and (c) means for varying the damping and spring coefficients of said arrangement in response to and dependent on the position and velocity of said moving body in combination with said calculation and in a way which dampens the movement of said body.

* * * * *